No. 811,109. PATENTED JAN. 30, 1906.
F. VEITH.
PNEUMATIC TIRE.
APPLICATION FILED APR. 29, 1905.

Witnesses
Julius Hutz
John Lotka

Inventor
Friedrich Veith
By Briesen & Knauth
Attorneys

UNITED STATES PATENT OFFICE.

FRIEDRICH VEITH, OF HÖCHST-IN-THE-ODENWALD, GERMANY.

PNEUMATIC TIRE.

No. 811,109.     Specification of Letters Patent.     Patented Jan. 30, 1906.

Application filed April 29, 1905. Serial No. 257,971.

*To all whom it may concern:*

Be it known that I, FRIEDRICH VEITH, a subject of the Grand Duke of Hesse, and a resident of Höchst-in-the-Odenwald, in the Grand Duchy of Hesse, Germany, have invented certain new and useful Improvements in Pneumatic Tires, of which the following is a specification.

My invention relates to improvements in pneumatic tires whereby the danger of damaging the tire with tools during its application to the wheel-rim, and also the danger of pinching the tire in the rim-recesses are avoided.

The objects of my improvement are, first, to make the cover of a cross-section in the shape of a horseshoe and to provide its inner edges with flanges, and, second, to provide an india-rubber tube of a circular cross-section, an inner portion of which projects outwardly into its cavity, so that on inflating the tube this inner portion will project inwardly. I attain these objects by the construction illustrated in the accompanying drawings, in which—

Figure 1:
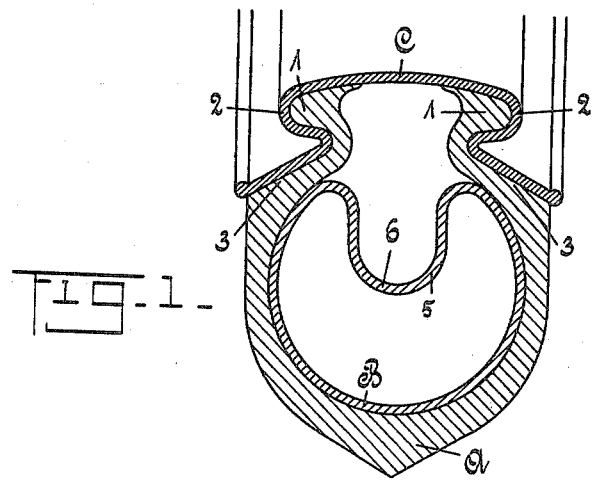
Figure 2:
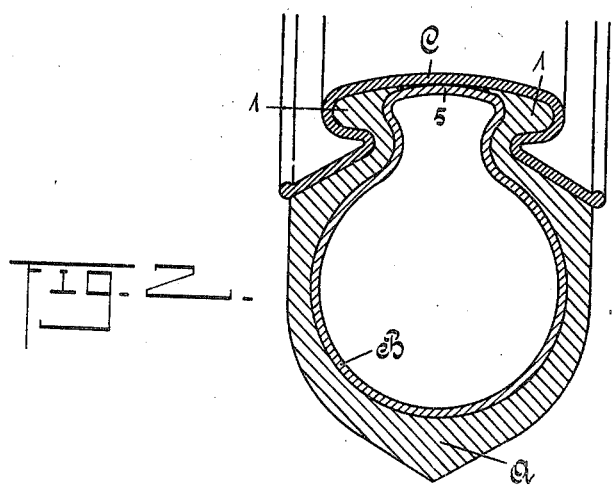

Figure 1 is a cross-section through a pneumatic tire and a wheel-rim, the india-rubber tube being in its natural state; and Fig. 2 is a similar cross-section in which the india-rubber tube is inflated.

As is well known the india-rubber tube of known pneumatic tires is very apt to get damaged by the tools on being inserted in its casing or cover and on the pneumatic tire being applied to the rim. The defects of the india-rubber tube so produced give occasion to frequent complaints and inconveniences. The chief cause for such defects lies in the fact that the external diameter of the not-inflated india-rubber tube is almost equal to the internal diameter of the casing or cover, so that in using the tools it is almost impossible to avoid any touch between their points and the internal tube.

My improved pneumatic tire consists of a cover A of a cross-section in the shape of a horseshoe and an india-rubber tube B. The inner edges of the cover A are provided with flanges 1 1, which are adapted to engage in corresponding recesses 2 2 of the wheel-rim C, and the shoulders 3 3 of the cover A are arranged to rest on the conical faces of the rim C, as is clearly shown in both figures. The india-rubber tube B is so formed that in its natural state (shown at Fig. 1) its internal portion 5 projects outwardly into its cavity. Otherwise the tube B fairly fits to the internal faces of the cover A, so that it can be readily inserted in the cover A. When applying the pneumatic tire in the usual manner to the wheel-rim C with the aid of tools, the latter acting upon the flanges 1 1 or upon the shoulders 3 3 are not likely to come in contact with the inner portion 5 of the internal tube B, so that the latter remains intact. Thus the application of the pneumatic tire to the wheel-rim C can be effected with perfect safety. On inflating the internal tube B in the usual manner its inner portion 5 will yield to the pressure of the compressed air and project inwardly, as is clearly shown at Fig. 2. The wheel-rim C may be provided with one or several fine holes for the escaping air which previously filled up the space 6 between the rim C, the inner portion 5, and parts of the cover A, so as to enable the inner portion 5 to completely bear against the rim C. Where so preferred, of course the fine holes in the rim C may be omitted, in which case the air within the space 6 will be simply compressed and form a pad, the space 6 being of course reduced. In both cases the two flanges 1 1 of the cover A will be pressed into the recesses 2 2 of the rim C, and thereby secured. When the compressed air is permitted to escape from the internal tube B, the elasticity of the inner portion 5 will return the latter into its initial position. (Shown at Fig. 1.) This will be clear when taking into consideration that the inner portion 5 in its natural state has a larger diameter, so that on inflating the tube B this portion 5 will be compressed for attaining the smaller diameter. It is evident that no pinching of the internal tube B between the rim C and the flanges 1 1 of the cover A can take place during the application of the pneumatic tire to the wheel-rim. The peculiar shape of the cross-section of the internal tube B also greatly facilitates the manufacture of this tube with the aid of molds, since every pinching of the tube in the closed mold, consisting of several parts previous to the vulcanization, can be avoided.

What I claim as my invention, and desire to secure by Letters Patent, is—

1. A pneumatic tire consisting of a cover of a cross-section in the shape of a horseshoe and an india-rubber tube, of which an inner portion normally projects outwardly into its cavity, so that on inflating the tube this inner portion will project inwardly.

2. In a pneumatic tire, the combination with a wheel-rim having two opposite annular recesses, of a cover of a cross-section in the shape of a horseshoe, the inner edges of which are provided with two flanges for engaging in the annular recesses of said wheel-rim, and an india-rubber tube, of which an inner portion normally projects outwardly into its cavity, so that on inflating the tube this inner portion will project inwardly and fill up the space between said wheel-rim and the flanges of said cover.

3. In a pneumatic tire, the combination with a wheel-rim having two diverging conical portions and two opposite annular recesses behind them, of a cover of a cross-section in the shape of a horseshoe and having two shoulders and two flanges on its inner edges, the shoulders being adapted to rest on the conical portions of said wheel-rim and the flanges being adapted to engage in the annular recesses thereof, and an india-rubber tube of a circular cross-section, of which an inner portion normally projects outwardly into its cavity, so that on inflating the tube this inner portion will project inwardly and fill up the space between said wheel-rim and the flanges of said cover.

In testimony whereof I have hereunto set my hand in the presence of two subscribing witnesses.

FRIEDRICH VEITH.

Witnesses:
EDWARD ROUGE,
JEAN GRUND.